(12) United States Patent
Di et al.

(10) Patent No.: US 11,023,153 B2
(45) Date of Patent: Jun. 1, 2021

(54) INSTALLATION OF OPERATING SYSTEM

(71) Applicant: New H3C Information Technologies Co., Ltd., Zhejiang (CN)

(72) Inventors: Yahui Di, Beijing (CN); Feng Shi, Beijing (CN); Lina Lang, Beijing (CN)

(73) Assignee: New H3C Information Technologies Co., Ltd., Zhejiang (CN)

( * ) Notice: Subject to any disclaimer, the term of this patent is extended or adjusted under 35 U.S.C. 154(b) by 0 days.

(21) Appl. No.: 16/634,111

(22) PCT Filed: Jul. 26, 2018

(86) PCT No.: PCT/CN2018/097220
§ 371 (c)(1),
(2) Date: Jan. 24, 2020

(87) PCT Pub. No.: WO2019/020074
PCT Pub. Date: Jan. 31, 2019

(65) Prior Publication Data
US 2020/0210088 A1    Jul. 2, 2020

(30) Foreign Application Priority Data
Jul. 28, 2017  (CN) .......................... 201710630915.4

(51) Int. Cl.
*G06F 8/61* (2018.01)
*G06F 3/06* (2006.01)

(52) U.S. Cl.
CPC .......... *G06F 3/0644* (2013.01); *G06F 3/0604* (2013.01); *G06F 3/0629* (2013.01); *G06F 3/0689* (2013.01); *G06F 8/61* (2013.01)

(58) Field of Classification Search
CPC .... G06F 3/0689; G06F 3/0629; G06F 3/0604; G06F 3/0644; G06F 8/61
See application file for complete search history.

(56) References Cited

U.S. PATENT DOCUMENTS 7,971,047 B1 * 6/2011 Vlaovic .............. G06F 9/45558
713/1
8,255,584 B2 * 8/2012 Lee .......................... G06F 3/00
710/15
(Continued)

FOREIGN PATENT DOCUMENTS

CN     102467395 A    5/2012
CN     102567051 A    7/2012
(Continued)

OTHER PUBLICATIONS

ISA State Intellectual Property Office of the People's Republic of China, International Search Report Issued in Application No. PCT/CN2018/097220, dated Oct. 29, 2018, WIPO, 4 pages.
(Continued)

*Primary Examiner* — Ryan Bertram
(74) *Attorney, Agent, or Firm* — McCoy Russell LLP

(57) ABSTRACT

A method and device for installing an operating system are provided. In an example, in a temporary system, a target RAID for installing the operating system and a unique identifier of the target RAID are determined in response to a user operation of specifying a disk array RAID. Then, a mounting point corresponding to the RAID unique identifier is found according to a correspondence between a unique identifier of a RAID and a mount point; and the target partition for installing the operating system is determined in the found mount point, and an identifier is added for the target partition. In a small system for an operating system to be installed, an installation partition and an installation disc where the installation partition is located may be determined by the identifier of the target partition, and the operating system is installed into the installation partition of the installation disc.

15 Claims, 4 Drawing Sheets

(56) References Cited

U.S. PATENT DOCUMENTS

| | | | |
|---|---|---|---|
| 2005/0120170 A1* | 6/2005 | Zhu | G06F 3/0607 711/114 |
| 2006/0259730 A1* | 11/2006 | Gimpl | G06F 9/5077 711/173 |
| 2008/0065858 A1 | 3/2008 | Zimmer et al. | |
| 2008/0065875 A1* | 3/2008 | Thompson | G06F 3/0689 713/2 |
| 2008/0244561 A1 | 10/2008 | Teraya | |
| 2010/0192145 A1* | 7/2010 | Liles | G06F 8/60 717/174 |
| 2010/0217944 A1 | 8/2010 | DeHaan et al. | |
| 2010/0274877 A1 | 10/2010 | Goetz et al. | |
| 2015/0271014 A1 | 9/2015 | Madama | |
| 2016/0019106 A1* | 1/2016 | Ali | G06F 9/4408 714/6.23 |
| 2016/0306649 A1* | 10/2016 | Gunti | G06F 9/4406 |
| 2017/0293448 A1* | 10/2017 | Bolen | G06F 3/0689 |
| 2020/0042300 A1* | 2/2020 | Szwarc | G06F 3/0689 |
| 2020/0210088 A1* | 7/2020 | Di | G06F 8/61 |

FOREIGN PATENT DOCUMENTS

| | | |
|---|---|---|
| CN | 102968358 A | 3/2013 |
| CN | 103984575 A | 8/2014 |
| CN | 105426207 A | 3/2016 |
| CN | 105589690 A | 5/2016 |
| CN | 106502657 A | 3/2017 |
| CN | 106708579 A | 5/2017 |
| JP | 2003186557 A | 7/2003 |

OTHER PUBLICATIONS

State Intellectual Property Office of the People's Republic of China, Office Action and Search Report Issued in Application No. 201710630915.4, dated Dec. 4, 2019, 11 pages. (Submitted with Partial Translation).

"RAID-1 configuration and management," Nikhef Wikipedia Website, Available Online at https://wiki.nikhef.nl/grid/RAID-1_configuration_and_management, Apr. 25, 2007, 5 pages.

"Oracle Solaris 10 1/13 Installation Guide: JumpStart Installations," Oracle Website, Available Online at https://docs.oracle.com/cd/E26505_01/pdf/E28039.pdf, Available as Early as Jan. 1, 2013, 174 pages.

ISA State Intellectual Property Office of the People's Republic of China, Written Opinion of the International Searching Authority Issued in Application No. PCT/CN2018/097220, dated Oct. 29, 2018, WIPO, 8 pages.

European Patent Office, Extended European Search Report Issued in Application No. 18839440.7, dated Jul. 3, 2020, Germany, 10 pages.

European Patent Office, Office Action Issued in Application No. 18839440.7, Apr. 1, 2021, Germany, 5 pages.

* cited by examiner

INSTALLATION OF OPERATING SYSTEM

CROSS REFERENCE TO RELATED APPLICATIONS

The present application is a U.S. National Phase of International Patent Application Serial No. PCT/CN2018/097220 entitled "INSTALLATION OF OPERATING SYSTEM," filed on Jul. 26, 2018. International Patent Application Serial No. PCT/CN2018/097220 claims priority to Chinese Patent Application No. 201710630915.4, filed on Jul. 28, 2017. The entire contents of each of the above-cited applications are hereby incorporated by reference in their entirety for all purposes.

BACKGROUND

In a Linux system, a mount point can be understood as an entry directory of a disk file system in the Linux system, such as sda, sdb, etc. In a Windows system, the mount point can be understood as a disk in the Windows system, such as Disk0, Disk1, Disk2, and so on.

When installing an operating system such as Linux or Windows, the operating system is installed by default on a specific mount point. For example, the Linux system is installed by default on the disk sda, and the Windows system is installed by default on the disk Disk0.

BRIEF DESCRIPTION OF THE DRAWINGS

FIG. 2 is a schematic diagram of obtaining a RAID UID according to an example of the present disclosure;

FIG. 3 is a schematic diagram of obtaining a correspondence between a RAID UID and a mount point according to an example of the present disclosure;

DETAILED DESCRIPTION OF THE EMBODIMENTS

Figure 1:
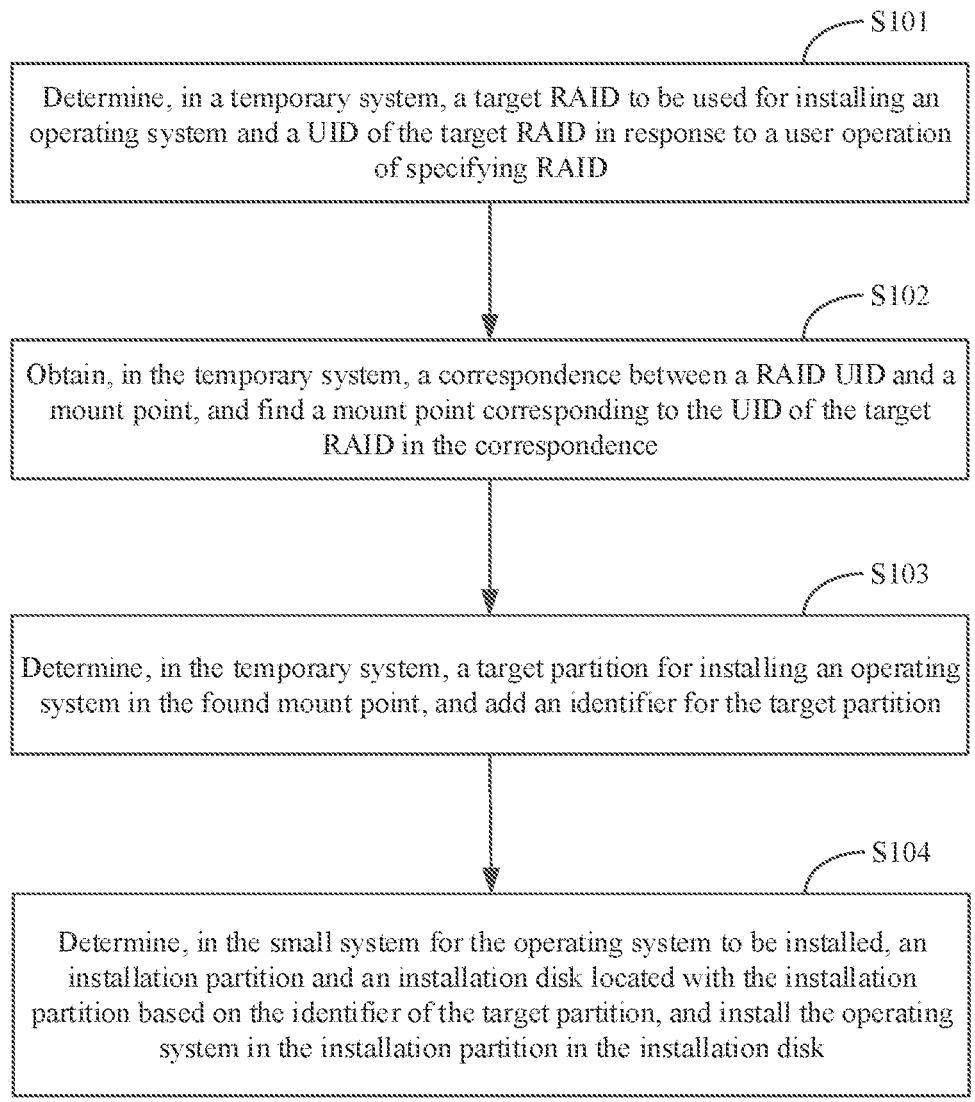
FIG. 1 is a schematic flowchart of a method for installing an operating system according to an example of the present disclosure.

Exemplary implementations will be described in detail herein with the examples thereof expressed in the drawings. When the following descriptions involve the drawings, like numerals in different drawings represent like or similar elements unless stated otherwise. The implementations described in the following exemplary examples do not represent all implementations consistent with the present disclosure. On the contrary, they are examples of an apparatus and a method consistent with some aspects of the present disclosure described in detail in the appended claims.

The terminology used in the present disclosure is for the purpose of describing a particular example only, and is not intended to limit the present disclosure. The singular forms such as "a", 'said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, etc. in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

A RAID (Redundant Arrays of Independent Disks) is a hard disk group formed by combining multiple independent physical hard disks in different ways. When an operating system is installed, the operating system is installed by default on a specific mount point. For a device in which RAIDs are created, a mount point corresponds to which one of the RAIDs is related to the sequence of RAID creation. For example, both the hard disk sda on a Linux system and the hard disk Disk0 on a Windows system correspond to a previously created RAID greater than 80 GB (unit: gigabyte). However, if a RAID is deleted or a new RAID is created before installing the operating system, the RAID corresponding to the mount point may change.

For example, if a RAID named RAID_A is created first and then a RAID named RAID_B is created, and each of RAID_A and RAID_B is greater than 80 GB, RAID_A and RAID_B correspond to mount points sda and sdb, respectively. The operating system is installed by default on RAID_A corresponding to the mount point sda. After that, if RAID_A is deleted and then a RAID named RAID_C is created, the later-created RAID_C may be in front of RAID_B in sequence. In this case, RAID_C corresponds to the mount point sda, and RAID_B corresponds to the mount point sdb. Therefore, the operating system is installed by default on the RAID_C corresponding to the mount point sda. Thus, since the mount point corresponds to which one of the RAIDs is related to the sequence in which the RAID is created, a user needs to view the creating sequence of RAIDs through the BIOS (Basic Input Output System), in order to learn on which RAID the operating system is installed. This is cumbersome and brings inconvenience for management.

To this end, the present disclosure provides a solution for installing an operating system, which may install the operating system on a specified RAID so as to easily identify a slot number corresponding to a system disk.

The method for installing an operating system provided by the present disclosure is described below.

The method can be applied to a computer or a server (hereinafter referred to as a target device) that has an operating system installation requirement and has RAID, and the method can be applied to at least the following three scenarios:

1. Install an operating system on a computer or server having no operating system installed;

2. Install an operating system on a computer or server having an operating system installed to form a dual operating system;

3. Reinstall an operating system having been installed on a computer or server.

Regardless of the scenario in which it is applied, the operational flow of the method is similar. FIG. 1 is a flowchart of a method for installing an operating system according to an example of the present disclosure. As shown in FIG. 1, the method can include blocks 101-104. Wherein, blocks 101-103 are performed in a temporary system, and block 104 is performed in a small system for an operating system to be installed. Next, the various blocks involved in the method are introduced.

Block 101: in a temporary system, a target RAID to be used for installing an operating system and a unique identifier (UID) of the target RAID are determined in response to a user operation of specifying RAID.

A target device where the operating system is to be installed may start a temporary system first. The temporary system may be considered as a tool for installing an operating system, and may be a Linux system, a Windows system, or the like.

In the temporary system, the target device can receive a user instruction through its own external interface, so as to determine on which RAID the operating system is to be installed. The external interface can be a graphical interface, a command line interface, a human-machine interface, or other form of interface.

After that, the target device can obtain a UID of the target RAID. The UID of the RAID is a firmware identifier used to uniquely identify the RAID. Assuming that RAID functions are implemented by a RAID card, the UID of the target RAID may be obtained by use of an arcconf command line. For example, referring to FIG. 2, when "arcconf getconfig 1LD" is entered on a command line interface, information relating a logic disk in the first RAID card may be obtained.

Block 102: in the temporary system, a correspondence between a RAID UID and a mount point may be obtained, and a mount point corresponding to the UID of the target RAID may be found from the correspondence.

Figures 2, 3:
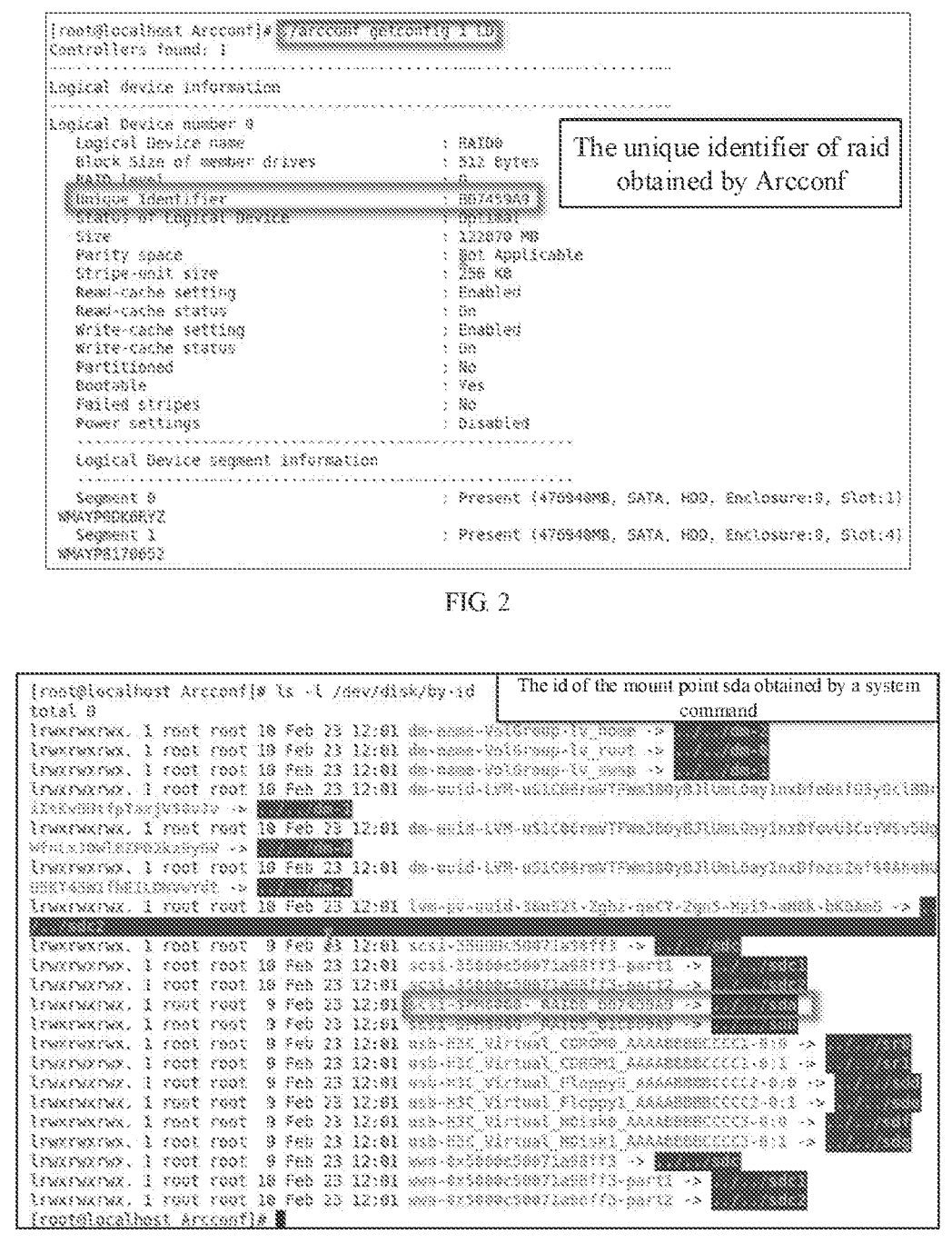

The target device can obtain a correspondence between a RAID UID and a mount point through system commands. For example, when the temporary system is a Linux system, the correspondence between the RAID UID and the mount point can be obtained through the system command "ls –1/dev/disk/by-id". For example, referring to FIG. 3, when "ls –1/dev/disk/by-id" is entered on the command line interface, a correspondence between a plurality of RAID UIDs and mount points may be presented. Referring to FIG. 2 and FIG. 3, it can be seen that the mount point corresponding to the UID "B07459A9" of RAID 0 is the hard disk sda.

Block 103: in the temporary system, a target partition for installing an operating system is determined in the found mount point, and an identifier is added for the target partition. Thus, the target partition is located on the target RAID.

After the target device finds the mount point, it can format the mount point first and then create a target partition on the mount point to install the operating system. For example, in a Linux system, the mount point sda may be formatted with the "mkfs.ntfs/dev/sda" command and a partition may be created with the "fdisk/dev/sda" command.

In the scenario where the operating system installed on the target device is to be reinstalled, if the partition located with the original operating system is just on the found mount point, the target device may not format the found mount point; and the partition located with the original operating system on the mount point is directly used as the target partition for installing the new operating system. Thus, the original operating system cannot be used when the installation of the new operating system is completed.

In a Linux system, a partition can be expressed in a form such as "/boot", "/usr/bin", and the like. In a Windows system, a partition is commonly named as "disk" or "Drive", for example, "disk C", "disk D", and so on. A partition may commonly include a primary partition, an extended partition, and other partition types. The target partition for installing an operating system above may be a primary partition. The advantage of installing the operating system in the primary partition is that: the size of the primary partition may be set according to instruction and it is not necessary to utilize the space of the whole hard disk to install an operating system. For example, in a Windows system, a partition may be created by a "create partition primary size=30000" command, and the "size" in the command indicates a partition size.

There are many ways to add an identifier to a target partition used to install an operating system. The following are two simple examples.

Method 1: Place an iconic file in the target partition used to install the operating system. The iconic file may be a file randomly named and in any form, as long as the iconic file can be unique. For example, the iconic file can be flag.txt.

Method 2: Set an iconic name for the target partition used to install the operating system. The iconic name can also be an arbitrary name as long as the iconic name can be unique.

In the present disclosure, the reason for adding the identifier to the target partition for installing the operating system is that blocks 101-103 are performed in the temporary system, and the subsequent blocks of installing the operating system are performed in a small system for the operating system to be installed. The temporary system and the small system may be of different types, for example, the temporary system may be a Linux system, and the small system may be a small system for the Winboot system. When the temporary system and the small system are of different types, the RAID of the same name may indicate different hard disks in the different system stages.

For example, in a Linux system, assume that RAID 0 includes two hard disks on slot number 0 and slot number 1. However, in a Windows system, RAID 0 may include hard disks on other two slot numbers. In order to ensure that the hard disk on which the operating system is finally installed is included in the target RAID determined in block 101, an identifier is added to the target partition located on the target RAID. Thus, in the subsequent installation phase, the target partition can be identified according to the identifier, and furthermore, the RAID located with the target partition is identified.

However, in the case where the temporary system and the small system for the operating system to be installed are of the same type, since the target RAID determined in block S101 is the installation disk determined in the following block S104, it is unnecessary to add an identifier to the target partition for installing an operating system in block 103.

After an identifier is added to the target partition, the name and the type of the identifier may be recorded in a file to be saved in a boot partition. The boot partition is a partition that stores various boot files (such as an auto response file mentioned hereinafter).

In addition, after determining the target partition for installing the operating system, the target device can also configure the target partition as an installation partition in an auto response file. The auto response file is a file used to complete automatic installation of the operating system and includes configuration data such as user passwords. It should be noted that since the temporary system and the operating system to be installed may be of different types, it is not temporarily configured in the automatic response file which RAID is the installation disk.

After the above blocks are performed, before the block 104 is performed, the target device where the operating system is to be installed may exit the current temporary system, and after the shutdown and restart, enter the small system for the operating system to be installed to perform the following block 104.

Block 104: in the small system for the operating system to be installed, an installation partition and an installation disk located with the installation partition may be determined based on the identifier of the target partition, and the operating system to be installed is installed in the installation partition in the installation disk.

In one way, assuming that an iconic file is used to identify the target partition for installing the operating system, in block 104, the target device may find the target partition including the iconic file by traversing each of the partitions, and determine the RAID located with the target partition as the installation disk.

Figures 4, 5:
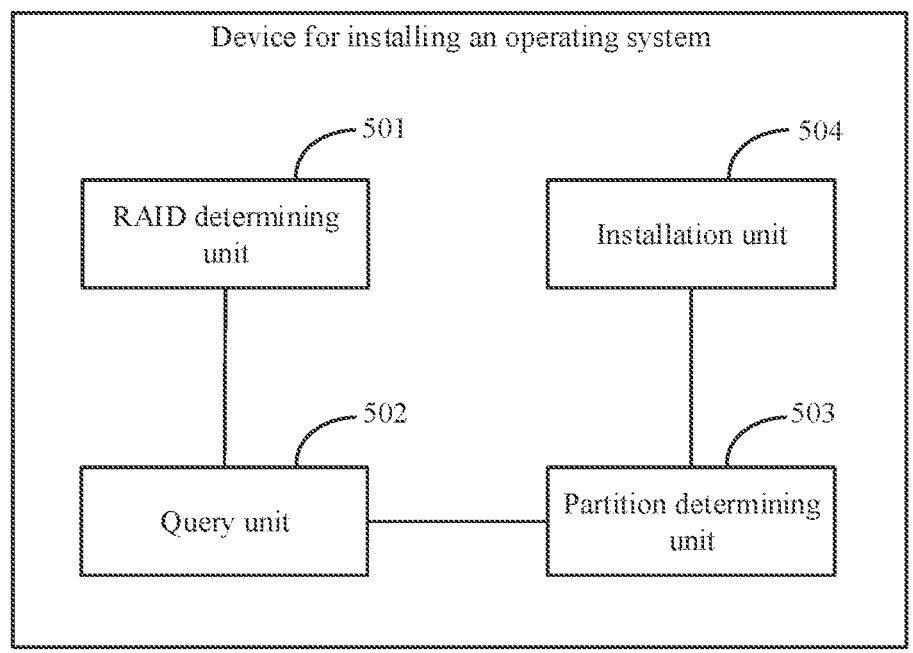
FIG. 4 is a schematic diagram of a relationship between a RAID and a partition according to an example of the present disclosure.
FIG. 5 is a functional block diagram of a device for installing an operating system according to an example of the present disclosure.

For example, referring to FIG. 4, assume that the iconic file is found by scanning to locate in the partition D, and therefore, the partition D may be determined as the installation partition; and the partition D may be found to locate on the disk Disk 2 by a "select disk 2" command, so the RAID with a number 2 where the partition D locates may be determined as the installation disk.

It should be noted that, since the temporary system and the operating system to be installed may be of different types, the name of the RAID located with the installation partition determined here may be different from that of the target RAID determined in block 101, but the hard disks included in the two RAIDs are the same.

After that, the target device configures the target partition including the iconic file as the installation partition in the automatic response file, and configures the RAID located with the installation partition as the installation disk. When the configuration of the auto response file is completed, the auto response file may run to install the operating system in the installation partition of the installation disk indicated by the auto response file. After the installation is completed, it may be chosen to delete the iconic file.

In another way, assume that an iconic name is used to identify the target partition for installing the operating system, in block 104, the target device may find the target partition corresponding to the iconic name by traversing each of the partitions, and determine the RAID located with the target partition as the installation disk. After that, the target device configures the target partition corresponding to the iconic name as the installation partition in the automatic response file, and configures the RAID located with the installation partition as the installation disk. When the configuration of the auto response file is completed, the auto response file may run to install the operating system to the installation partition of the installation disk indicated by the auto response file.

So far, the flow shown in FIG. 1 is completed.

As can be seen from the flow shown in FIG. 1, in the present disclosure, the operating system can be installed on the RAID selected by the user. In this way, it is convenient for the user to manage the system hard disk (hereinafter, simply referred to as the system disk) on which the operating system is installed. For example, when a detailed location of the system disk is learned, during the system reinstallation, it can be avoided to install the operating system to a data hard disk (hereinafter referred to as a data disk) not having an operating system installed. In this disclosure, a user can also freely set the size of the partition where the operating system is located so as to make best use of the hard disk space.

The method provided by the present disclosure has been described above. The device provided by the present disclosure will be described below.

Referring to FIG. 5, FIG. 5 is a functional block diagram of a device for installing an operating system provided by the present disclosure, which may include the following units:

The RAID determining unit 501 is configured to determine, in a temporary system, a target RAID for installing an operating system and a unique identifier of the target RAID in response to a user operation of specifying a RAID.

The query unit 502 is configured to obtain, in the temporary system, a correspondence between a unique identifier of a RAID and a mount point, and find a mount point corresponding to the unique identifier of the target RAID in the correspondence.

The partition determining unit 503 is configured to determine, in the temporary system, a target partition for installing an operating system in the found mount point, and add an identifier to the target partition.

The installation unit 504 is configured to determine, in a small system for the operating system to be installed, an installation partition and an installation disk where the installation partition is located according to the identifier of the target partition, and install the operating system into the installation partition of the installation disk.

In an example, the installation unit 504 is further configured to: configure the target partition as an installation partition in an automatic response file, and configure a RAID where the installation partition is located as an installation disk in the automatic response file.

It should be noted that the installation unit 504 can configure the installation partition and the installation disk at different stages. For example, in a scenario where the temporary system and the small system for the operating system to be installed are of different types, the installation unit 504 can configure, in the temporary system, the target partition as an installation partition in the automatic response file, and configure, in the small system for the operating system to be installed, the RAID where the installation partition is located as the installation disk in the automatic response file.

In one example, the partition determination unit 503 identifies the target partition by placing an iconic file within the target partition. In this case, the installation unit 504 can find the partition containing the iconic file as an installation partition by traversing the respective partitions, and determine that the RAID in which the installation partition is located is an installation disk.

In one example, the partition determining unit 503 identifies the installation partition by setting an iconic name for the installation partition. In this case, the installation unit 504 can find the partition corresponding to the iconic name as the installation partition by traversing the respective partitions, and determine that the RAID in which the installation partition is located is an installation disk.

In an example, the installation unit 504 is configured to install an operating system to be installed on an installation partition of the installation disk indicated by the automatic response file.

In an example, the target partition for installing an operating system is a primary partition, and the primary partition is configured in size according to an instruction.

So far, the description of the device shown in FIG. 5 is completed.

Figure 6:
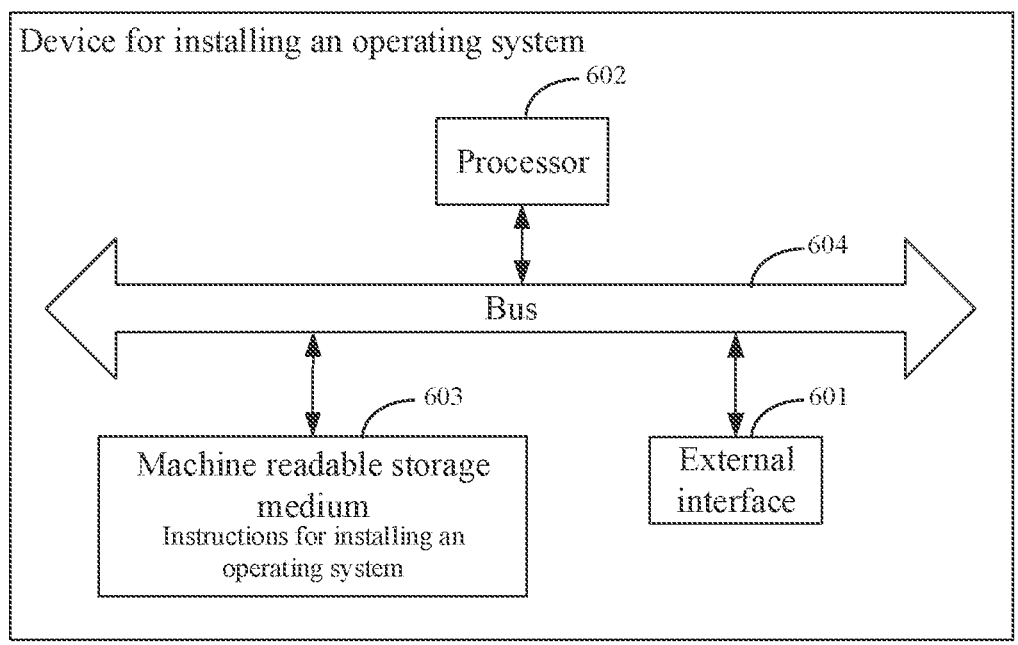
FIG. 6 is a hardware architecture diagram of the device shown in FIG. 5 according to an example of the present disclosure.

Correspondingly, the present disclosure also provides the hardware structure of the device shown in FIG. 5. Referring to FIG. 6, FIG. 6 is a schematic hardware structural diagram of the device shown in FIG. 5 provided by the present disclosure, where the device includes: an external interface 601, a processor 602, a machine readable storage medium 603, and a bus 604; wherein, the external interface 601, the processor 602, and the machine readable storage medium 603 completes communication with each other via the bus 604.

The external interface 601 is configured to receive instructions such as instructions for specifying to which RAID the operating system is to be installed, and the like. The processor 602 may be a CPU, the machine readable storage medium 603 may be a non-volatile memory, and the machine readable storage medium 603 stores machine executable instructions for installing an operating system, and the processor 602 may execute the machine executable instructions stored in the machine readable storage medium 603 to implement the above method of installing an operating system, which is referenced in the flow shown in FIG. 1.

So far, description of the hardware structure of the device shown in FIG. 6 is completed.

The above description is only for the preferred example of the present disclosure, and is not intended to limit the present disclosure. Any modifications, equivalent substitutions, improvements, etc., which are made within the spirit and principles of the present disclosure, should be included within the scope of the present disclosure.

The invention claimed is:

1. A method for installing an operating system, comprising:
   determining, in a temporary system, a target Redundant Arrays of Independent Disks (RAID) for installing the operating system and a unique identifier of the target RAID in response to a user operation of specifying the target RAID;
   obtaining, in the temporary system, a correspondence between a unique identifier of a RAID and a mount point, and finding a mount point corresponding to the unique identifier of the target RAID in the correspondence;
   determining, in the temporary system, a target partition for installing the operating system in the found mount point, and adding an identifier to the target partition;
   determining, in a small system for the operating system to be installed, an installation partition and an installation disk where the installation partition is located according to the identifier of the target partition, and installing the operating system into the installation partition of the installation disk.

2. The method of claim 1, wherein installing the operating system into the installation partition of the installation disk, comprises:
   configuring the target partition as the installation partition in an auto response file, and
   configuring a RAID in which the installation partition is located as the installation disk in the automatic response file.

3. The method of claim 1, wherein adding the identifier to the target partition comprises:
   placing an iconic file within the target partition.

4. The method of claim 3, wherein determining the installation partition and the installation disk where the installation partition is located according to the identifier of the target partition comprises:
   finding a partition containing the iconic file as the installation partition, and
   determining a RAID where the installation partition is located as the installation disk.

5. The method of claim 1, wherein, adding the identifier to the target partition comprises:
   setting an iconic name for the target partition.

6. The method of claim 5, wherein determining the installation partition and the installation disk where the installation partition is located according to the identifier of the target partition comprises:
   finding a partition corresponding to the iconic name as the installation partition, and
   determining a RAID where the installation partition is located as the installation disk.

7. The method of claim 1, wherein the installation partition is a primary partition,
   a size of the primary partition is configured according to instructions.

8. A device for installing an operating system, comprising:
   a non-transitory machine readable storage medium storing machine executable instructions;
   a processor for executing the machine executable instructions to:
   determine, in a temporary system, a target Redundant Arrays of Independent Disks (RAID) for installing the operating system and a unique identifier of the target RAID in response to a user operation of specifying the target RAID;
   obtain, in the temporary system, a correspondence between a unique identifier of a RAID and a mount point, and find a mount point corresponding to the unique identifier of the target RAID in the correspondence;
   determine, in the temporary system, a target partition for installing the operating system in the found mount point, and add an identifier to the target partition;
   determine, in a small system for the operating system to be installed, an installation partition and an installation disk where the installation partition is located according to the identifier of the target partition, and install the operating system into the installation partition of the installation disk.

9. A non-transitory machine readable storage medium having a plurality of machine executable instructions stored thereon, the machine executable instructions being executable to:
   determine, in a temporary system, a target Redundant Arrays of Independent Disks (RAID) for installing an operating system and a unique identifier of the target RAID in response to a user operation of specifying the target RAID;
   obtain, in the temporary system, a correspondence between a unique identifier of a RAID and a mount point, and find a mount point corresponding to the unique identifier of the target RAID in the correspondence;
   determine, in the temporary system, a target partition for installing the operating system in the found mount point, and adding an identifier to the target partition;
   determine, in a small system for the operating system to be installed, an installation partition and an installation disk where the installation partition is located according to the identifier of the target partition, and install the operating system into the installation partition of the installation disk.

10. The device of claim 8, wherein when installing the operating system into the installation partition of the installation disk, the processor is further caused by the machine executable instructions to:
configure the target partition as the installation partition in an auto response file, and
configure a RAID in which the installation partition is located as the installation disk in the automatic response file.

11. The device of claim 8, wherein when adding the identifier to the target partition, the processor is further caused by the machine executable instructions to:
place an iconic file within the target partition.

12. The device of claim 11, wherein when determining the installation partition and the installation disk where the installation partition is located according to the identifier of the target partition, the processor is further caused by the machine executable instructions to:
find a partition containing the iconic file as the installation partition, and
determine a RAID where the installation partition is located as the installation disk.

13. The device of claim 8, wherein, when adding the identifier to the target partition, the processor is further caused by the machine executable instructions to:
set an iconic name for the target partition.

14. The device of claim 13, wherein when determining the installation partition and the installation disk where the installation partition is located according to the identifier of the target partition, the processor is further caused by the machine executable instructions to:
find a partition corresponding to the iconic name as the installation partition, and
determine a RAID where the installation partition is located as the installation disk.

15. The device of claim 8, wherein,
the installation partition is a primary partition,
a size of the primary partition is configured according to instructions.

* * * * *